United States Patent [19]

Lair et al.

[11] Patent Number: 5,328,177
[45] Date of Patent: Jul. 12, 1994

[54] CONTAMINANT RESISTANT PISTON SEAL WITH ENERGIZED BACKUP SCRAPERS

[76] Inventors: Paul D. Lair, 1232 Summer Cir., Okoboji, Iowa 51355; Paul D. Parker, 2009 NW. 10th St., Ankeny, Iowa 50021

[21] Appl. No.: 126,678

[22] Filed: Sep. 24, 1993

Related U.S. Application Data

[63] Continuation of Ser. No. 868,974, Apr. 16, 1992, abandoned.

[51] Int. Cl.$^5$ ................................. F16J 9/06
[52] U.S. Cl. ........................... 277/1; 277/27; 277/165; 277/188 A
[58] Field of Search .............. 277/165, 188 A, 141, 277/154, 165, 188 R, 1, 27

[56] References Cited

U.S. PATENT DOCUMENTS

| | | | |
|---|---|---|---|
| 3,582,094 | 6/1971 | Whittaker | 277/188 A X |
| 3,614,114 | 10/1971 | Traub | 277/165 |
| 3,771,801 | 11/1973 | Burke | 277/188 A |
| 3,920,252 | 11/1975 | Dechavanne | 277/165 X |
| 3,990,712 | 11/1976 | Dechavanne | 277/165 |
| 3,999,767 | 12/1976 | Sievenpiper | 277/165 X |
| 4,032,159 | 6/1977 | Zitting | 277/188 A X |
| 4,067,584 | 1/1978 | Hunger | 277/165 |
| 4,468,041 | 8/1984 | Yoshimura et al. | 277/165 X |
| 4,576,386 | 3/1986 | Benson et al. | 277/165 |
| 5,088,744 | 2/1992 | Oseman | 277/165 X |

FOREIGN PATENT DOCUMENTS

| | | | |
|---|---|---|---|
| 3533797 | 4/1987 | Fed. Rep. of Germany | 277/188 A |
| 2604235 | 3/1988 | France | 277/188 A |

Primary Examiner—William A. Cuchlinski, Jr.
Assistant Examiner—Daniel G. DePumpo
Attorney, Agent, or Firm—Zarley, McKee, Thomte, Voorhees & Sease

[57] ABSTRACT

The inner annular surface of a load ring includes a concave contour such that when pressure is applied to the center of the outer surface the elastomer material will flatten out and cause oppositely disposed feet to kick up and radially outwardly and in turn apply increased pressure to backup rings engaging the cylinder wall. The inner surface of the load ring includes oppositely disposed ramp surfaces which slope radially outwardly and towards each other such that fluid pressure on the backup rings or pressure from the load ring feet will move the backup rings into tighter engagement with the cylinder wall for improved sealing and scraping action.

11 Claims, 1 Drawing Sheet

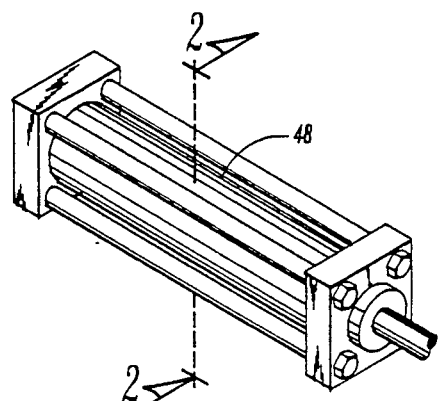
FIG.1
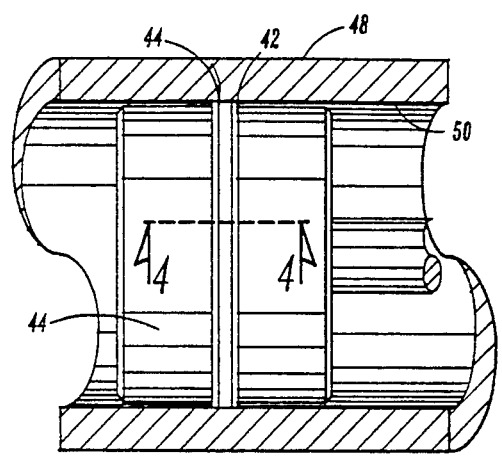
FIG.2
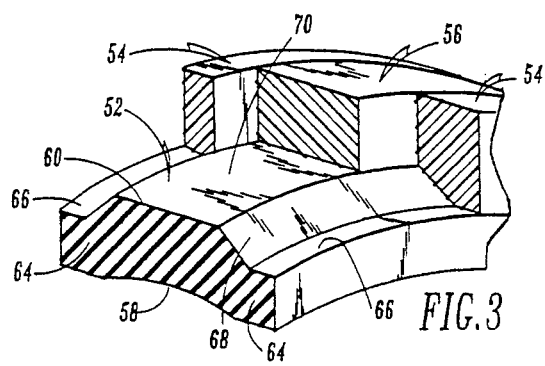
FIG.3
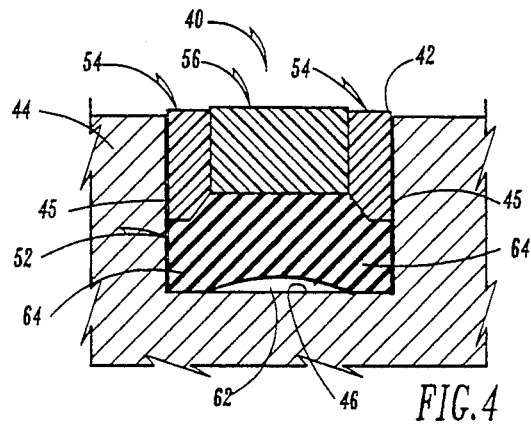
FIG.4
FIG.5
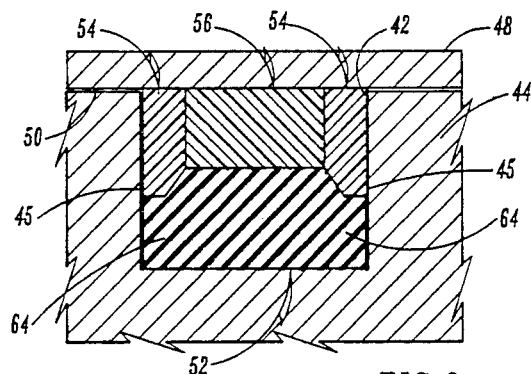
FIG.6
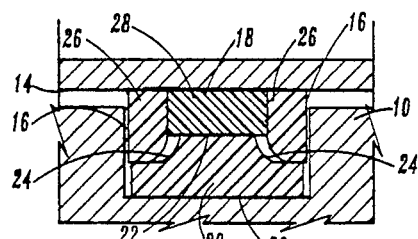
FIG.7
(PRIOR ART)

CONTAMINANT RESISTANT PISTON SEAL WITH ENERGIZED BACKUP SCRAPERS

This is a continuation of application Ser. No. 07/868,974 filed Apr. 16, 1992, now abandoned.

BACKGROUND OF THE INVENTION

The prior art as seen in FIG. 7 includes a piston 10 movable inside a cylinder 12 having a cylinder wall 14. The piston 10 includes a seal groove 16 in which a seal assembly 18 is positioned. The seal assembly includes a load ring 20 having a center peripheral surface 22 and oppositely disposed steps 24 on which backup rings 26 are mounted. The backup rings 26 engage the opposite sides of a seal ring 28 which in turn is in engagement with the cylinder wall 14.

Pressure from the cylinder wall 14 applied to the seal ring 28 in turn applied to the load ring 20 may cause some lateral spreading of the steps 24 but have no noticeable effect on the backup rings 26. The inner side 30 of the load ring 20 in abutment with the bottom wall of the groove 16 is flat both in its free state before assembled in a cylinder (not shown) and when assembled as seen in FIG. 7.

The object of the seal assembly is to prevent flow past the piston between the cylinder wall and the piston but also through the inclusion of the backup rings keep contaminants from reaching the seal ring 28 which would cause damage to the seal ring and the cylinder wall 14. Seal assemblies of this type and variations thereof have not been satisfactory in this regard over extended periods of use.

SUMMARY OF THE INVENTION

The effectiveness of the backup rings in keeping contaminants from the center seal ring has been substantially enhanced by two important modifications to the load ring. The first is that the side of the load ring engaging the bottom wall of the groove includes a center annular recess which allows pressure from the cylinder wall against the seal ring bearing on the load ring to depress the center of the load ring toward the bottom wall of the groove thereby causing the outer oppositely disposed feet or steps of the load ring to kick up or outwardly which in turn cause the backup rings to move outwardly towards the cylinder wall. The second change is that sloped ramp surfaces are provided which extend towards each other and inwardly to the center of the load ring. The backup rings are positioned on these sloped surfaces and thus lateral pressure on them will cause them to ride up the sloped surfaces and into tighter contact with the cylinder wall. This increased pressure on the backup rings may come from the outward kick of the load ring feet or lateral fluid pressures within the cylinder. It has been found that this arrangement substantially improves the sealing effectiveness of this type of seal assembly.

DESCRIPTION OF THE DRAWINGS

FIG. 1 is a fragmentary perspective view of a cylinder having a piston therein utilizing the seal assembly of this invention.

FIG. 2 is a cross sectional view taken along line 2—2 in FIG. 1.

FIG. 3 is a fragmentary perspective view of only the seal assembly.

FIG. 4 is a cross sectional view taken along line 4—4 in FIG. 2 showing the seal assembly mounted in the piston groove before the piston has been installed in the cylinder.

FIG. 5 is a diagrammatical view illustrating the load forces on the center of the load ring causing the outer oppositely disposed feet to kick upwardly in the opposite direction.

FIG. 6 is a view similar to FIG. 4 but showing the piston installed in the cylinder.

FIG. 7 is a cross sectional view similar to FIG. 6 but showing a prior art construction.

DESCRIPTION OF PREFERRED EMBODIMENT

The seal assembly of this invention is referred to generally by the reference numeral 40 in FIG. 3 and is shown in FIG. 2 mounted in a groove 42 on a piston 44. The groove 42 includes opposite side walls 45 interconnected by a bottom wall 46. The piston 44 is mounted in a cylinder 48 having an inner cylinder wall 50.

The seal assembly 40 includes an elastomer energizer load ring 52 on which nylon scrapper backup rings 54 are mounted on opposite sides of a TEFLON seal ring 56. The load ring 52 includes an inner surface 58 and an outer surface 60. The backup rings 54 include a diagonal cut which allows the end edges to slide against each other as the rings expand and contract while maintaining a substantially continuous outer edge in engagement with the cylinder wall 50. The center of the inner surface 58 is concave which forms, with the bottom wall 46 of the groove 42, a recess 62 as seen in FIG. 4. Outwardly of the concave surface in the inner surface 58 are what may be regarded as kick up feet 64 which have laterally inwardly extending step surfaces 66 which merge into radially outwardly sloping ramp surfaces 68 which in turn merge into a center surface 70 of the outer surface 60.

The TEFLON seal ring 56 which is rectangular in cross section is positioned on the center surface 70 of the outer surface 60. The nylon scrapper backup rings 54 have inner surfaces matingly engaging the step surfaces 66 and ramp surfaces 68.

As seen in FIG. 4 the outer diameter of the seal ring 56 is larger than that of the backup rings 54 but both exceed the inner diameter of the cylinder 48. The primary seal ring 56 thus is pressed inwardly against the center surface 70 of the outer surface 60 which in turn causes the load ring 52 to flatten out on its inner surface 58 as seen in FIG. 6. This action in turn causes the feet 64 to kick up or radially outwardly thereby applying pressure to the backup rings 54 mounted on the ramps 68 which in turn causes the backup rings to move along the ramps towards each other and outwardly towards the cylinder wall 50 to cause increased sealing pressure between the backup rings and the cylinder wall 50. The increase sealing and scraper action of the backup rings 54 on the cylinder wall 50 may be caused by the outward kick of the feet 64 as seen by the force arrows 80 in FIG. 5 or lateral fluid pressures applied to the backup rings during operation of the piston 44 in the cylinder 48. As seen in FIGS. 4 and 6 the groove 42 is substantially filled by the seal assembly 40 such that there is very little space between the sides of the load ring 52, backup rings 54 and the side walls 45. The outer surfaces of the backup rings 54 are flat and include square corners at the side walls for improved sealing and scraping action along the cylinder wall 50.

What is claimed is:

1. A contamination resistant cylinder and piston assembly comprising,
   a piston movable in a cylinder having a cylinder wall and a central longitudinal axis, said piston including an annular groove facing said cylinder wall, said groove having opposite side walls and an interconnecting bottom wall,
   a contamination resistant seal assembly positioned in said groove and having a free state, a preloaded state, and a pressure loaded state and comprising,
   a load ring on the bottom wall of said groove and having a radial inner surface and an outer surface and opposite side walls, said bottom wall of said annular groove and said radial inner surface defining a recess therebetween in said free state,
   said outer surface including a center surface portion spaced radially outwardly from oppositely disposed feet,
   said feet including ramp surfaces which slope towards each other and towards said center surface portion,
   said ramp surfaces at their ends opposite said center surface intersect step surfaces which are parallel to said central longitudinal axis and extend to said opposite side walls,
   a seal ring mounted on the center surface portion of the outer surface,
   a pair of backup rings radially supported on said oppositely disposed feet and ramp surfaces, said backup rings having a cylindrical radial outer surface parallel to said longitudinal axis, inner and outer side walls, and an inner surface for mating with said feet and ramp surfaces,
   said piston assembly being in said free state before being assembled into said cylinder, and said piston assembly after said seal ring, load ring, and backup rings are positioned thereon having a combined diameter which is greater than said cylinder,
   wherein said preloaded state occurs upon assembly of said piston assembly into said cylinder to put said seal ring in sealed engagement with said cylinder wall and creates a radially compressive force directed toward said load ring center surface portion; said load ring being axially constrained by said piston groove such that said load ring radial inner surface responds by moving into said recess and toward said bottom wall; said force also causing said feet to move radially outward and said backup ring mating surfaces supported thereon to move along said ramp surfaces toward said center surface portion and radially outwardly toward said cylinder wall into contamination scraping engagement with the same, and
   wherein said pressure loaded state occurs when said piston assembly is exposed to lateral fluid pressure within the cylinder wall and said pressure acts on said outer side wall of one of said backup rings to further force the same up said ramp surfaces toward said center surface portion and outwardly into contamination scraping engagement with said cylinder wall.

2. The structure of claim 1 wherein said load ring is made of elastomer material.

3. The structure of claim 2 wherein said seal ring is made of polytetrafluoroethylene material.

4. The structure of claim 3 wherein said backup rings are made of a nylon material.

5. The structure of claim 1 wherein said backup rings each have a axial thickness which is smaller than the axial thickness of said seal ring.

6. The structure of claim 1 wherein said ramp surfaces at their ends opposite said center surface merge into step surfaces which are in a cylinder plane parallel to said center surface portion and extend to said opposite side walls.

7. The structure of claim 1 wherein said load ring is made of elastomer material.

8. The structure of claim 1 wherein said seal ring is made of polytetrafluoroethylene material.

9. The structure of claim 1 wherein said backup rings are made of a nylon material.

10. The contamination resistant cylinder and piston assembly of claim 1 wherein the axial thickness of each of said backup rings is less than the radial thickness of the same.

11. A method of providing backup, pressure sealing, and contamination protection for a piston assembly within a cylinder, comprising;
   installing a load ring into an annular groove facing radially outwardly on the piston, said groove having opposite side walls and an interconnecting bottom wall, said load ring having a radial inner surface and an outer surface and opposite side walls, said bottom wall of said groove and said radial inner surface of said load ring defining a recess therebetween, said outer surface including a center surface portion spaced radially outwardly from oppositely disposed feet, said feet including ramp surfaces which slope towards each other and towards said center surface portion;
   placing a seal ring having opposing sides, an inner diameter, and an outer diameter upon said load ring center surface, the effective outer diameter of said seal ring when so placed upon said load ring and piston being greater than the inner diameter of the piston bore;
   backing up said seal ring with a pair of backup rings having a cylindrical outer radial surface, two opposing sides, and an inner radial surface for mating engagement with said load ring ramp and feet, one of said backup rings being mounted on each of said opposing sides of said seal ring so as to mate with said ramp and feet surfaces of said load ring, whereby a first state known as the free state is achieved;
   inserting said piston assembly into the cylinder bore so as to compress the seal ring between the wall of the bore and said groove of the piston so that said seal ring is forced inward radially into said load ring, said load ring being axially constrained by said piston groove such that said load ring radial inner surface responds by moving into said recess and towards said bottom wall, said force also causing said feet to move radially outward and said backup ring mating surfaces supported thereon to move longitudinally along said ramp surfaces toward said center surface portion and radially outwardly toward said cylinder wall into contamination scraping engagement with the same, whereby a preloaded state exists in which said seal ring and backup rings are urged into engagement with the cylinder wall; and
   pressurizing the cylinder thereby exposing one of said backup ring sides remote from said seal ring to lateral fluid pressure, said pressure acting against said side of said backup ring to further force said backup ring up said ramp surfaces of said load ring toward said center surface portion and outwardly into contamination scraping engagement with the cylinder wall, thereby resulting in a pressure loaded state wherein contamination is prevented from reaching said seal ring.

* * * * *